Feb. 25, 1958
R. J. DE BURGH
2,824,638
MAGNETIC CONVEYOR
Filed June 25, 1954
2 Sheets-Sheet 1
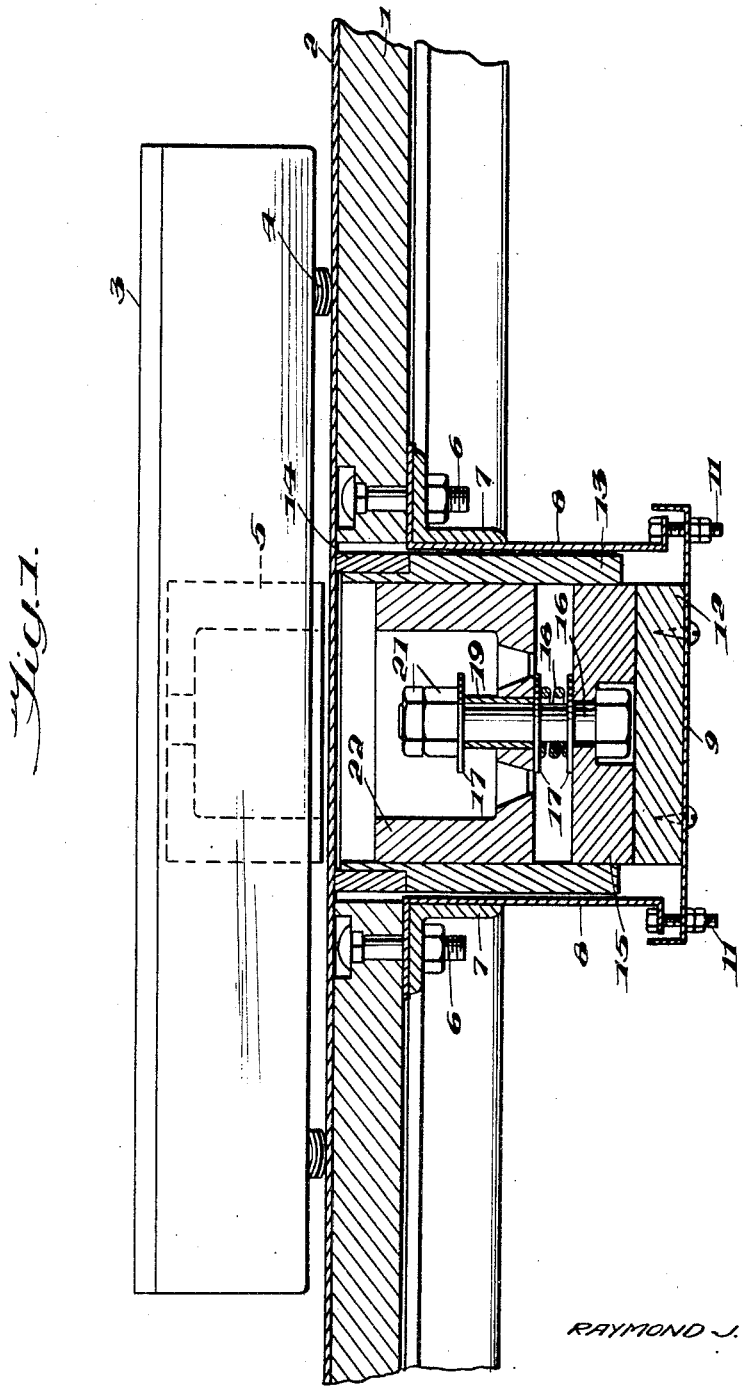
INVENTOR
RAYMOND J. DE BURGH,
BY Robert B. Pierson
ATTORNEY Feb. 25, 1958  R. J. DE BURGH  2,824,638
MAGNETIC CONVEYOR
Filed June 25, 1954  2 Sheets-Sheet 2
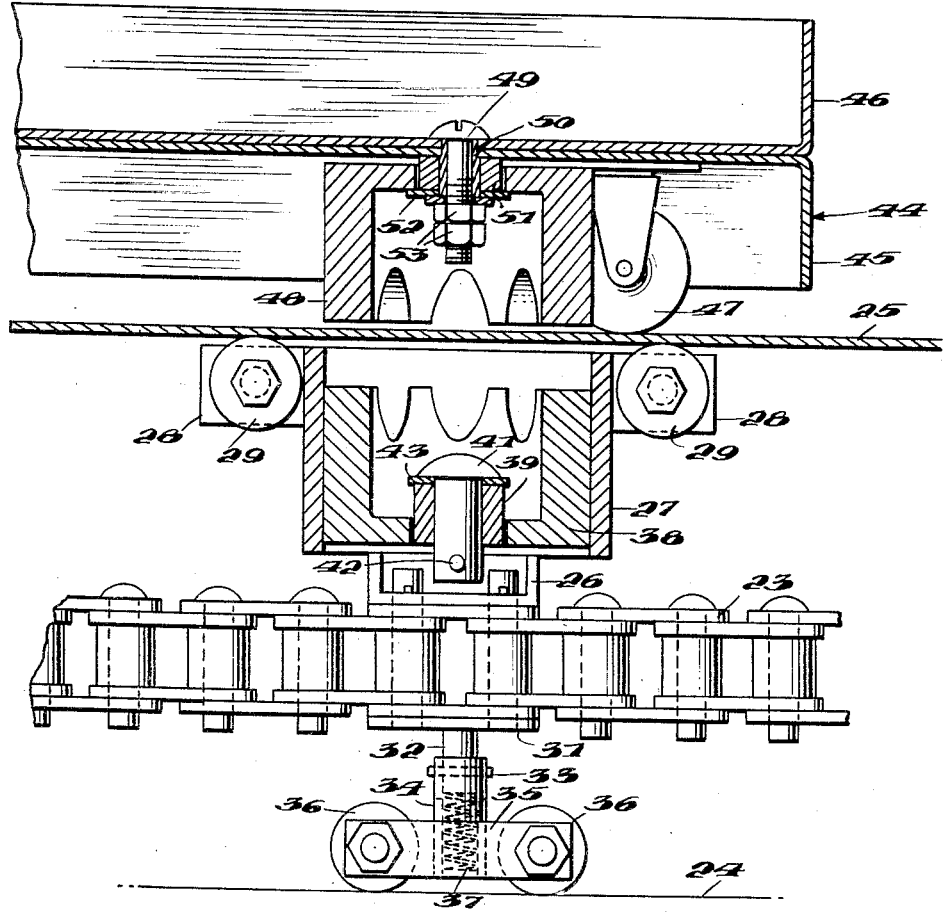
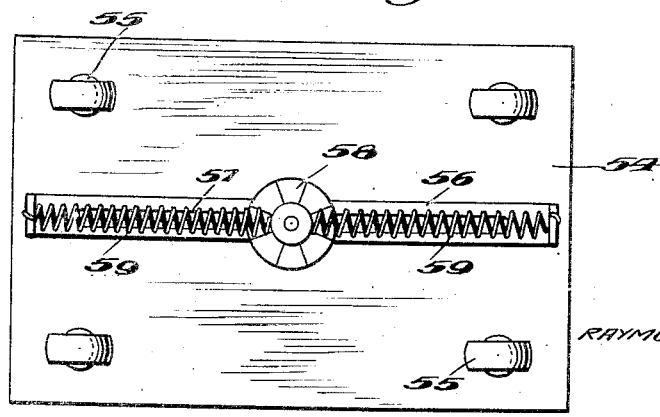
INVENTOR
RAYMOND J. DeBURGH, United States Patent Office 2,824,638
Patented Feb. 25, 1958

2,824,638

MAGNETIC CONVEYOR

Raymond J. De Burgh, Seattle, Wash.

Application June 25, 1954, Serial No. 439,383

8 Claims. (Cl. 198—41)

This invention relates to conveying apparatus, and more particularly to magnetic conveyors of the type disclosed in Patent No. 2,609,915 entitled, "Conveying Apparatus," issued September 9, 1952. Specifically, the present invention contemplates an improved means for mounting the magnets on the movable article carrier and the conveyor chain so that a maximum attractive force between the magnets is maintained at all times.

I have found that when using conveying apparatus such as disclosed in the above referred to patent, the magnet or magnetically attractable material on the carrier and the magnet, or magnetically attractable material, on the driving member were not aligning themselves in positions of maximum attraction, that is, in exact alignment. As a result, the pallets or article carriers could not carry a maximum load. It was found that the magnet or magnetically attractable material on the carrier would be attracted to the edge of the magnet or magnetically attractable material on the conveyor as the conveyor passed beneath the carrier so that the maximum attractive force available was not utilized. I, therefore, found it necessary to develop a mounting which would prevent this edge attraction from occurring and would permit the magnets or magnetically attractable material to assume perfectly aligned positions.

Another problem encountered when using conveyors which rely upon magnetic attraction to cause the carrier to follow the conveyor driving means involves overcoming the inertia of a loaded pallet. When it is desired to start a heavily weighted article carrier it has frequently occurred that the attractive force between the magnets or magnet and magnetic material has not been sufficient to overcome the inertia of the article carrier. The present invention contemplates a novel means for overcoming this inertia whereby loaded pallets may be started without any difficulty.

As pointed out in the patent hereinbefore referred to, it is apparent that highly permeable material may be substituted for a magnet so that a magnet and magnetically attractable material may be used together. The word "magnet," as employed hereinafter, is intended to cover the use of both a magnet and magnetically attractable material.

According to the present invention there is provided a magnet mounting means on the conveyor driving means which permits the magnet to assume a position spaced from the underside of the surface on which the article carrier is resting when the magnet is not attracted to a carrier magnet. The conveyor magnet is movable vertically from the spaced position to a position closely adjacent the underside of the supporting surface. The spacing is such that when only edges of the carrier and conveyor magnets are in vertical alignment insufficient magnetic force is developed to cause the conveyor magnet to move vertically. It is only when the conveyor and carrier magnets are in exact alignment that there is sufficient magnetic force to cause the conveyor magnet to move to a position adjacent the underside of the supporting surface. In this manner the problem of "edge attraction" hereinbefore referred to is overcome. It is further apparent that the magnets may be swivelly mounted, if desired, so that exact opposite polar alignment of the conveyor and carrier magnets may be obtained. In order to permit loaded pallets to be started without difficulty according to the present invention the magnet on the carrier may be mounted for longitudinal movement along the underside of the carrier, such movement being opposed by spring or similar means. Thus, when a conveyor magnet passes beneath the carrier, instead of requiring the carrier to immediately assume the speed of the conveyor, the presently disclosed mounting permits the carrier to gradually gain speed.

A primary object of this invention is to provide a conveyor in which magnetic attraction is relied upon as the coupling between the movable work support and the conveyor drive means and in which means is provided to assure that the maximum magnetic force available is utilized in driving the carrier or work.

Another object of this invention is the provision of a magnetic conveyor in which means is provided to overcome the inertia of a heavily weighted work support.

A further object of the present invention is the design of novel mounting means for magnets in a conveying apparatus whereby through permitting vertical movement of the magnets an exact opposite alignment of the magnets is attained.

Other objects and many of the attendant advantages of the present invention will become apparent in the light of this specification when considered in connection with the accompanying drawings wherein:

Fig. 1 is a view in elevation, partly in section, showing one form of conveying apparatus embodying the present invention, Fig. 2 is a vertical sectional view illustrating another embodiment of this invention, and Fig. 3 is a plan view of the underside of a work support showing a mounting which may be used with the apparatus shown in Figs. 1 or 2.

Referring now to the drawings wherein like numerals indicate like parts throughout the several views, there is shown at 1 a flat supporting surface. This surface represents the surface over which it is desired to pass the work supports or pallets and may be a warehouse floor or a table top as shown. The surface is provided with a covering 2 which may be constructed of any sturdy non-magnetic material such as non-magnetic stainless steel. Over this surface rides a pallet or article carrier 3 which is supported on casters or wheels 4. A carrier is shown in plan in Fig. 3 wherein it can be seen that the carrier is rectangularly shaped and provided with four supporting wheels. A magnet 5 which may be of any suitable shape, but is preferably cylindrical as shown, is pivotally mounted on the underside of the carrier.

Within the supporting surface there is provided a cut-out portion which extends along the path of movement of the conveyor. Along the sides of this cut-out portion there are secured by means of bolts 6 angle braces 7 which form a frame for the conveyor guideway. Also secured to the supporting surface 1 by bolts 6 are members 8 which form the side walls of the guideway. The side walls are provided with outwardly extending flanges at their lower edges to form convenient mounting means for the bottom wall 9. The bottom wall is attached to the side walls by bolts 11 which are elongated and provided with double locking nuts so as to permit the spacing between the side walls and bottom wall to be adjusted at will for purposes which will be explained hereinafter. Attached to the bottom wall is a wood block 12 which forms a runner for the moving elements of the conveyor driving means.

The conveyor driving means consists of a chain or cable (not shown) which passes through the guideway and to which are attached the conveyor magnet mounting means. The mounting means for the conveyor magnet comprises a tube 13 which may be of stainless steel or other non-magnetic material and which has a circumferential recess in the upper end thereof for the reception of a hardwood ring 14 which acts as a runner against the underside of the table covering member 2. Press fit in the lower end of the tube is a wooden disc 15 which cooperates with runner 12 to form bearing surfaces. Centrally recessed within the disc 15 is an elongated bolt 16 having washers 17, spring 18, sleeve 19 and nuts 21 disposed thereon to retain the bolt in the position shown. Slidably disposed on sleeve 19 is a cylindrically shaped magnet 22 which is similar to the magnet 5 on the carrier previously described.

A plurality of tubes 13 and associated magnet supporting elements are spaced along the conveyor chain at the desired spacing for the work supports. Any suitable power means may be utilized to pull the conveyor chain or cable through the guideway. As a magnet 22 passes beneath a stationary article carrier 3 and comes into the magnetic field of magnet 5, the magnet on the conveyor chain will move vertically on sleeve 19 to a position directly beneath the table covering 2. It is apparent that both of the magnets may be swivelly mounted so that they can rotate to positions in exact opposite polar alignment. The advantage in mounting the conveyor magnet for vertical movement is in avoiding "edge attraction" in that the edges of the magnets are insufficiently attracted to cause the conveyor magnet to move vertically. When the magnets are in correct alignment there is sufficient magnetic attraction to cause the conveyor magnet to move vertically to a position directly beneath the supporting surface. In this manner the maximum magnetic force available is utilized and the pallets can carry a maximum load.

In Fig. 2 is shown another embodiment of the invention. A vertical sectional view through the conveyor is shown which is substantially at right angles to the section of Fig. 1 so that the conveyor chain 23 is seen. The conveyor chain in this form of the invention is retained in proper alignment in the guideway by means of rollers which bear against both the bottom wall 24 of the guideway and the underside of the covering member 25 of the supporting surface. At suitably spaced points along the conveyor chain there are provided bracket members such as shown at 26, each of which supports a tubular member 27. Welded or otherwise secured to the tubular member are bearing blocks 28 which form mounting means for rollers 29 rotatably journalled thereon. On the lower face of the conveyor chain is secured a plate 31 having a pin 32 integral therewith. The other end of the pin is provided with a cross piece 33 which rides within slots (not shown) in a sleeve 34. Mounted on the sleeve is a frame 35 for rotatably supporting rollers 36 which ride against the bottom wall 24 of the guideway. Within sleeve 34 is disposed a spring 37 which urges the frame 35 and rollers outwardly against the bottom wall of the guideway.

Within the tubular member 27 is slidably disposed a cylindrically shaped magnet 38 having a centrally located aperture for the reception of a sleeve 39 disposed on pin 41. A cross piece 42 on the end of this pin extends into suitable openings in flanges (not shown) on bracket 26 to prevent movement of the pin relative to the tubular member 27. It can be seen that the magnet 38 can move vertically on the sleeve 39, washer 43 forming a convenient stop.

The pallet or work support 44 in this embodiment is formed of two metallic plates 45 and 46 having flanged edge portions, the plates being secured together with the flanges extending in opposite directions as shown. The upwardly extending flange on plate 46 serves as a guard rail for articles carried on the pallet whereas the downwardly extending flange on plate 45 prevents material on the table from being carried beneath the pallet. The pallet or article carrier is provided with the usual casters 47. The magnet 48 is swivelly mounted on a pin 49 having sleeve 50 and bushing 51 disposed thereon. A washer 52 and nuts 53 support the magnet in the manner shown. The magnet is mounted towards the forward edge of the pallet so that the pallet will follow the movement of the conveyor chain regardless of the disposition of the load on the pallet.

The embodiment shown in Fig. 2 operates in the same manner as the device shown in Fig. 1, the magnet 38 on the conveyor chain moving upwardly and around the pin 41 to assume a position of exact opposite polar alignment with the magnet on the pallet.

In Fig. 3 is shown a mounting for the magnet on the pallet which is designed to assist in overcoming the inertia of a loaded pallet. A work support or pallet 54 is shown which is provided with casters or wheels 55. Extending longitudinally of the pallet is a channel member 56 having a slot 57 therein. The magnet 58 is rotatably mounted within the slot by means of a pin (not shown) and is normally maintained in a central position on the pallet by means of springs 59 which are secured to the magnet at one end and to bearing members at the other. The device operates as follows:

When the pallet 54 is heavily loaded and placed over the conveyor chain, as a conveyor magnet passes beneath the pallet the magnet 58, in following movement of the conveyor magnet, will move forwardly in the slot 57 against the pressure of one of the springs 59. The pallet will gradually pick up speed and, when it reaches the speed of the conveyor chain, the magnet 58 will again assume the normal position as shown. Thus it can be seen that by virtue of the arrangement just described it is not necessary to use magnets having sufficient attraction to overcome the inertia of a heavily loaded pallet starting from a stopped position.

It is apparent that the mounting shown in Fig. 3 may be used with either of the conveyors shown in Figs. 1 or 2 or may be used with conveyors such as shown in the prior patent previously referred to. The member 58 may, of course, be a magnet or may be of highly permeable material.

While all embodiments of the invention have been shown and described as having the conveyor and carrier magnets swivelly mounted to permit exact opposite polar alignment, it is apparent that this is not an esnestial feature of the invention. Magnets having one central pole and the other pole circumferentially disposed around the central pole could be used in which case it would be unnecessary to swivelly mount the magnets.

Having thus described the invention it is apparent that numerous changes in design and construction of the same may be employed without departing from the essentials thereof. In the appended claims the words "magnet" and "magnetic" are intended to cover the use of both a magnet and magnetically attractable material.

I claim:

1. A conveyor of the class disclosed comprising, in combination, a wheeled carrier adapted to serve as a work support while moving along a supporting surface, a first magnet swivelly mounted on the underside of said carrier, a guideway mounted on the underside of the supporting surface, said guideway including a bottom member disposed parallel to but spaced from the supporting surface, means associated with said bottom member to adjust the depth of the guideway, driving means disposed in said guideway, said driving means mounting said second magnet for pivotal movement in the plane of movement of said driving means and for transverse movement within said guideway whereby said second magnet is movable to a position beneath the supporting surface in close adjacency to said first magnet.

2. In a magnetic conveyor of the class described, a carrier adapted to serve as a work support and having wheels for movement along a work surface, a first magnet mounted on the underside of said carrier, driving means for said carrier disposed beneath said work surface, said driving means including a tube having wheels mounted thereon for movement along the underside of the work surface, a second magnet disposed within said tube, and means mounting said last named magnet for longitudinal movement within said tube whereby said first and said second magnets are adapted to align themselves for maximum attractive force.

3. A conveyor for moving articles over a surface comprising, in combination, a wheeled article carrier, magnetic means rotatably mounted on the underside of said article carrier, a guideway disposed on the underside of the surface, driving means for said article carrier disposed within said guideway, said driving means including, a chain, a pair of roller means interconnected with said chain and bearing against opposite sides of the guideway, a magnet disposed within one of said roller means, mounting means for said magnet whereby the magnet is movable longitudinally toward and away from the underside of the surface and is rotatable on an axis perpendicular to the longitudinal axis of the chain.

4. In a magnetic conveyor in which magnetic attraction causes a work support to follow the movement of a conveyor chain, the combination comprising a wheeled carrier constituting a work support, first magnetic means, means associated with said carrier including a slot for mounting said first magnetic means for pivotal and longitudinal movement with respect to said carrier, means yieldingly retaining said first magnetic means in a center position on said carrier, and driving means for said carrier including a second magnetic means, said first and second magnetic means cooperating to cause the carrier to follow the movement of the driving means, said yieldable means assisting in overcoming the inertia of the carrier by permitting said first magnetic means to initially move longitudinally with respect to the carrier.

5. In a magnetic conveyor in which magnetic attraction causes a work support to follow the movement of a conveyor chain, the combination comprising a wheeled carrier constituting a work support, a slotted channel member mounted on the underside of said carrier, magnetic means pivotally mounted within said slot and adapted to move longitudinally therein, means urging said magnetic means to a center position on the carrier, driving means for said carrier, a magnet, an elongated pin connected to said driving means, said elongated pin mounting said magnet for pivotal movement in the plane of movement of the driving means and for transverse movement along the pin to a position closely adjacent the magnetic means on said carrier whereby the magnet and the magnetic means automatically become aligned in positions of maximum magnetic attraction.

6. A conveyor of the class disclosed comprising, in combination, a wheeled carrier adapted to serve as a work support while moving along a table top, a slotted channel member mounted on the underside of said carrier, a first magnet pivotally mounted within said slot and adapted to move longitudinally therein, spring means urging said first magnet to a center position on the carrier, a guideway mounted on the underside of the table top, said guideway including a bottom member disposed parallel to but spaced from the table top, means associated with said bottom member to adjust the depth of the guideway, driving means disposed in said guideway, said driving means including a second magnet, means mounting said second magnet for pivotal movement in the plane of movement of said driving means and for transverse movement within said guideway whereby said second magnet is movable to a position beneath the table top in close adjacency to said first magnet.

7. The combination recited in claim 3 wherein a slotted channel member is mounted on the underside of the carrier and the magnetic means is pivotally mounted within the slot and means urges the magnetic means to a center position on the carrier.

8. In a magnetic conveyor in which magnetic attraction causes a work support to follow the movement of a conveyor chain, in combination, a wheeled carrier constituting a work support, magnetic means mounted on the underside of said carrier, driving means for said carrier, said driving means including a magnet, pivotal mounting means for said magnet whereby the magnet is rotatable on an axis perpendicular to the plane of the supporting surface of the wheeled carrier, said pivotal mounting means including means whereby said magnet is movable longitudinally along said axis so that said magnet is adapted to simultaneously move upwards and rotate to a position in exact polar alignment with said magnetic means.

References Cited in the file of this patent

UNITED STATES PATENTS

| 2,239,395 | Mallory | Apr. 22, 1941 |
|---|---|---|
| 2,603,676 | Morrison | July 15, 1952 |
| 2,609,915 | De Burgh | Sept. 9, 1952 |
| 2,642,174 | Buccicone | June 16, 1953 |